United States Patent
Maeda et al.

(10) Patent No.: US 6,547,019 B2
(45) Date of Patent: Apr. 15, 2003

(54) RESERVE TANK FOR ENGINE COOLANT AND STRADDLE-TYPE ALL TERRAIN VEHICLE EQUIPPED WITH THE RESERVE TANK

(75) Inventors: Kazuhiro Maeda, Akashi (JP); Yuji Yoshihata, Kobe (JP)

(73) Assignees: Kawasaki Jukogyo Kabushiki Kaisha, Kobe (JP); Moriroku Company, Ltd., Kobe (JP)

( * ) Notice: Subject to any disclaimer, the term of this patent is extended or adjusted under 35 U.S.C. 154(b) by 0 days.

(21) Appl. No.: 10/053,155

(22) Filed: Jan. 16, 2002

(65) Prior Publication Data

US 2002/0092856 A1 Jul. 18, 2002

(30) Foreign Application Priority Data

Jan. 16, 2001 (JP) ......................................... 2001-007797

(51) Int. Cl.[7] ........................... B60K 11/04; B29C 45/14
(52) U.S. Cl. ........................ 180/68.4; 220/564; 264/516
(58) Field of Search .................................. 180/68.4, 229, 180/225, 69.4; 220/564; 264/516, 513, 515, 511

(56) References Cited

U.S. PATENT DOCUMENTS

| 3,552,599 | A | * | 1/1971 | Redding ..................... 220/675 |
| 3,748,866 | A | * | 7/1973 | Heider et al. .................. 62/99 |
| 3,945,454 | A | * | 3/1976 | Kinoshita et al. .......... 180/68.4 |
| 4,274,548 | A | * | 6/1981 | Schneider ................... 220/675 |
| 4,367,187 | A | * | 1/1983 | Fukushima et al. ...... 264/37.16 |
| 4,394,333 | A | * | 7/1983 | Fukushima et al. ...... 264/37.15 |
| 4,439,126 | A | * | 3/1984 | Fukushima et al. ......... 425/135 |
| 4,526,286 | A | * | 7/1985 | Jung et al. .................. 220/563 |
| 4,763,724 | A | * | 8/1988 | Temmesfeld et al. ......... 165/71 |
| 5,722,556 | A | * | 3/1998 | Ota et al. ................. 220/367.1 |
| 5,894,649 | A | * | 4/1999 | Lambert et al. ........ 29/890.052 |
| 5,961,764 | A | * | 10/1999 | Sydow et al. ................ 156/242 |
| 6,041,744 | A | * | 3/2000 | Oota et al. ................ 123/41.49 |
| 6,116,335 | A | * | 9/2000 | Beamer et al. .............. 165/174 |
| 6,247,442 | B1 | * | 6/2001 | Bedard et al. ........... 123/198 E |
| 6,330,747 | B1 | * | 12/2001 | Lambert et al. ........ 29/898.052 |
| 6,332,505 | B1 | * | 12/2001 | Tateshima et al. ........... 180/229 |
| 6,338,420 | B1 | * | 1/2002 | Pachciarz et al. ............ 220/562 |

FOREIGN PATENT DOCUMENTS

JP      2000-254961      9/2000

\* cited by examiner

Primary Examiner—Brian L. Johnson
Assistant Examiner—Bridget Avery
(74) Attorney, Agent, or Firm—Kolisch Hartwell, P.C.

(57) ABSTRACT

A reserve tank for engine coolant formed by a blow molding method in which an external surface of the reserve tank is colored simultaneously with blow molding process and thus painting is unnecessary, and a straddle-type all terrain vehicle equipped with the reserve tank. The method comprises the steps of placing a thermoplastic tube, called a "parison", between halves of an open mold, closing the mold halves, blowing the parison to expand the parison to the cavities of the mold halves, and cooling the parison to set the material, thereby forming the reserve tank. The method further comprises the steps of placing a thermoplastic film with a color which is different from that of the parison so that it covers at least one of the cavities before closing the molds, and expanding the thermoplastic film to the cavities along with the parison so that the film sticks thereto.

5 Claims, 7 Drawing Sheets

PRIOR ART

FIG. 1A

PRIOR ART

FIG. 1B

PRIOR ART

FIG. 1C

PRIOR ART

RESERVE TANK FOR ENGINE COOLANT AND STRADDLE-TYPE ALL TERRAIN VEHICLE EQUIPPED WITH THE RESERVE TANK

BACKGROUND OF THE INVENTION

The present invention is related to a reserve tank for engine coolant formed by blow molding and to a straddle-type all terrain vehicle equipped with the reserve tank.

Straddle-type all terrain vehicles (generally called "ATVs") are three-wheeled or four-wheeled motor cycles and are utilized in various fields such as leisure, sport competitions, and border patrols since the vehicles are capable of stably traveling over irregular grounds such as dunes, uncultivated lands and swamps with large payload.

This type of the vehicle is often equipped with a water-cooled type engine, and thus the engine is generally provided with a radiator for engine coolant as well as a reserve tank for the engine coolant.

Figure 1A:
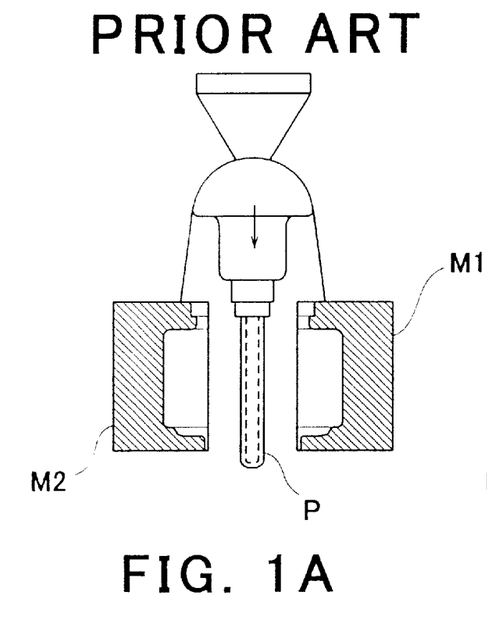
FIGS. 1A–1D are explanatory views for explaining a blow molding method of prior art.
Figure 1B:
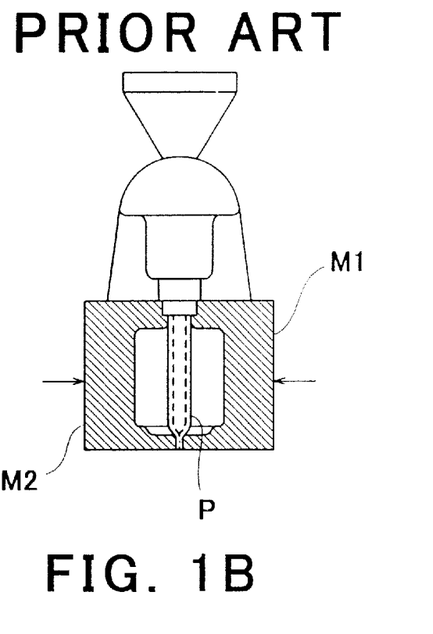
Figure 1C:
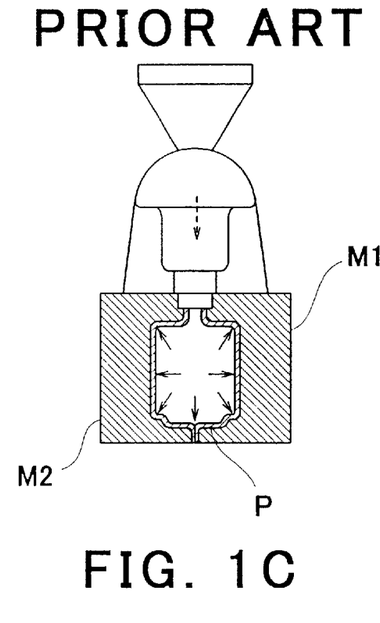
Figure 1D:
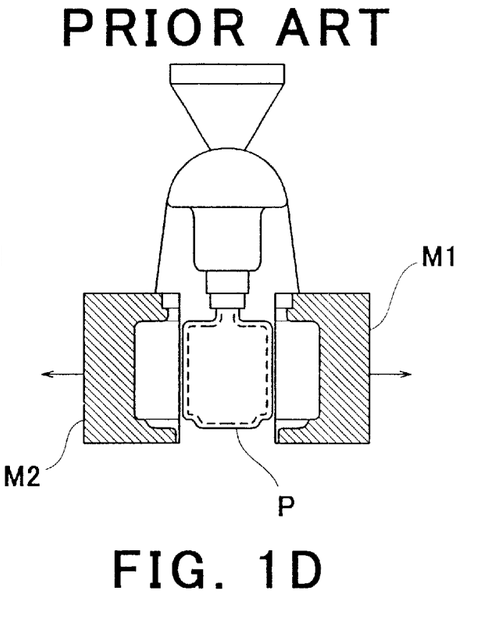

The reserve tank is formed by blow molding a white-opaque material (e.g. polypropylene (P.P.)) and the blow molding is generally performed as follows:

(1) First, as shown in FIG. 1A, a heated length of thermoplastic tube (generally called a "parison") P of polypropylene is placed on an air nozzle between the halves of open mold M1 and M2. (2) Second, as shown in FIG. 1B, the mold halves M1 and M2 close and pinch shut the lower open end of the parison P. (3) Third, as shown in FIG. 1C, air is blown in to expand the parison P to cavities of the mold halves M1 and M2, which are usually cooled to set the parison material. (4) Last, as shown in FIG. 1D, the mold halves M1 and M2 are re-opened, and the parison (i.e., finished product) P is ejected.

The above-mentioned reserve tank may be arranged on the all terrain vehicle behind the crank case so as to be externally exposed. In this case, the reserve tank is colored to a color corresponding to the body color of the vehicle.

Coloring the reserve tank is typically done by painting, however, painting requires extensive equipment, and painting materials have a bad affinity with the polypropylene that forms the reserve tank, and easily separate therefrom. In particular, since the reserve tank of the above-mentioned arrangement is exposed to the outside of the vehicle's body and is arranged behind the crank case, it has the problem of easily receiving scratches (these also include cracks and frays in this specification) from a rider's boots, the stone shuttlecock, etc.

BRIEF SUMMARY OF THE INVENTION

The present invention has been made with the aim of solving the above condition, and it is an object of the present invention to provide a reserve tank for engine coolant formed by a blow molding method in which an external surface of the finished product can be colored simultaneously with a blow molding process and thus make painting unnecessary, and also to provide a straddle-type all terrain vehicle equipped with the reserve tank.

In order to solve the above-mentioned condition, a reserve tank for engine coolant according to the present invention is formed by a blow molding method that comprises the steps of: forming a parison between halves of an open mold; blowing air into the parison to expand while pinching the parison between the mold halves; and forming a hollow product by cooling to harden the expanded parison pressed in cavities of the mold halves, wherein before pinching the parison between the mold halves, a thermoplastic film with a color which is different from the parison is so placed that the thermoplastic film covers at least one of the cavities, and wherein when blowing the parison, the thermoplastic film placed over the cavity is pressed along with the parison and stuck thereto.

Figure 2A:
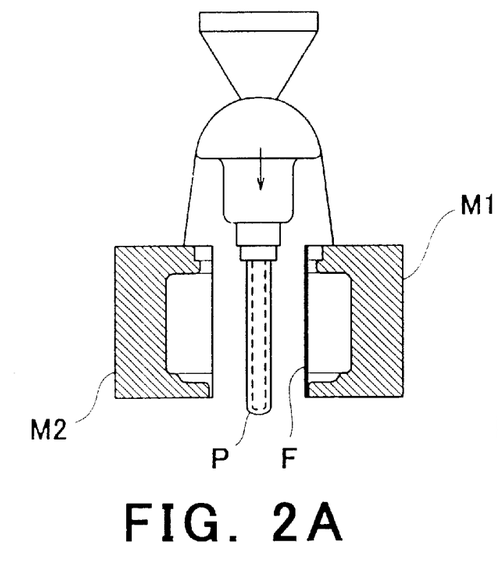
FIGS. 2A–2D are explanatory views for explaining a blow molding method used for a reserve tank for engine coolant according to the present invention.
Figure 2B:
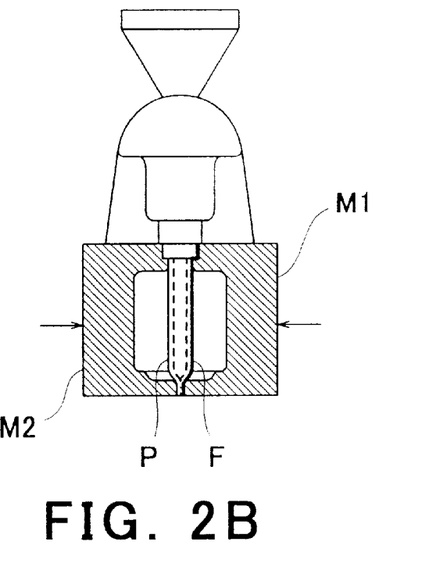
Figure 2C:
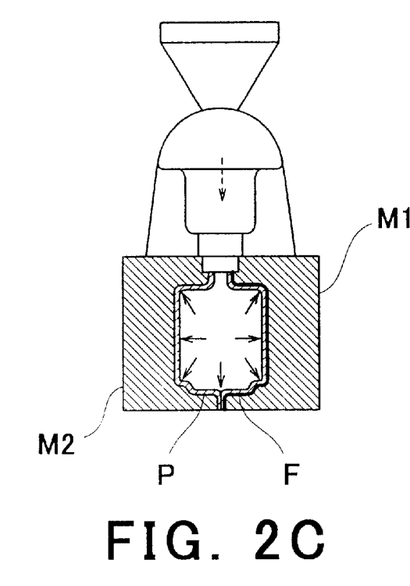
Figure 2D:
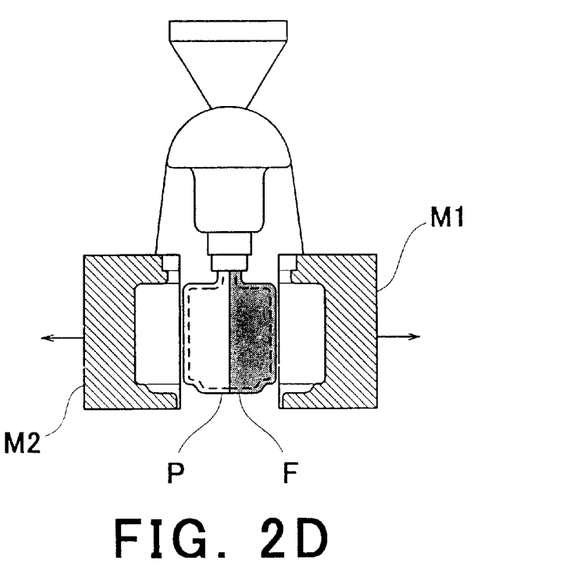

The principle of the blow molding method of the reserve tank for engine coolant according to the present invention is explained below referring to FIGS. 2A–2D. (1) First, as shown in FIG. 2A, a heated length of thermoplastic tube (parison) P of polypropylene is placed on an air nozzle between halves of open mold M1 and M2. In this case, the thermoplastic film F, which has a desired color, is arranged so that the thermoplastic film F covers, for example, a cavity of one mold M1. (2) Second, as shown in FIG. 2B, the mold halves M1 and M2 close and pinch shut the lower open end of the parison P as well as the lower end of the thermoplastic film F. (3) Third, as shown in FIG. 2C, air is blown in to expand the parison P to the cavities of the mold halves M1 and M2, which are cooled to set the parison material. Under this condition, the thermoplastic film F is pushed between the parison P and the mold half M1 in the state where the thermoplastic film F is heat deformed and stuck on along the surface of the heated parison P. (4) The mold halves M1 and M2 are cooled in this state, and the parison P inside thereof and the thermoplastic film F are hardened in the form of the cavities. Lastly, as shown in FIG. 2D, the mold halves M1 and M2 are re-opened, and the finished reserve tank which is covered with the thermoplastic film F is ejected.

Therefore, according to the present invention, at least one of the cavities of the blow molding mold is covered with the thermoplastic film having a color different from the parison, and then in this state ordinary blow molding is performed. The blown parison is forced between the cavities while carrying out heat deformation of the thermoplastic film, and an adhesion covering of the thermoplastic film having a color different from the parison is formed on the surface of the parison with cooling.

It becomes possible for a thermoplastic film to cover the main body of the reserve tank with such composition in the same process, without making virtually any improvements to an existing blow molding machine. By using an opaque material (including a colored material) for this thermoplastic film, it replaces paint, and coloring to the external surface of the reserve tank is attained. Moreover, it is possible by adopting a suitable thermoplastic film material to protect the reserve tank surface from scratches from the outside. Using the thermoplastic film as a surface treatment is also possible. In addition, in FIGS. 2A–2D, although the thermoplastic film F is arranged only on one cavity of the mold half M1, the thermoplastic film F may cover both cavities of the mold halves M1 and M2, or may cover one of the cavities.

Moreover, in accordance with the above-mentioned blow molding method, it is also possible as a thermoplastic film to use a similar material to the parison. Thus, by constituting as above, the affinity between the thermoplastic film and the parison can be improved and strong covering which cannot be easily influenced of the scratches from the outside can be obtained.

Moreover, in accordance with the above-mentioned blow molding method, by using a transparent material for the parison and by using an opaque material (or a colored material) for the thermoplastic film, a check window (for example, in order to check quantity of contents from the outside) can be formed on the reserve tank by removing a portion of the colored thermoplastic film which is adhesively hardened on the reserve tank so as to cover thereof. Thus, it is possible to easily obtain a suitable reserve tank for engine coolant for a straddle-type all terrain vehicle which does not easily receive scratches even if it is exposed to the outside of the vehicle's body.

Figure 3:
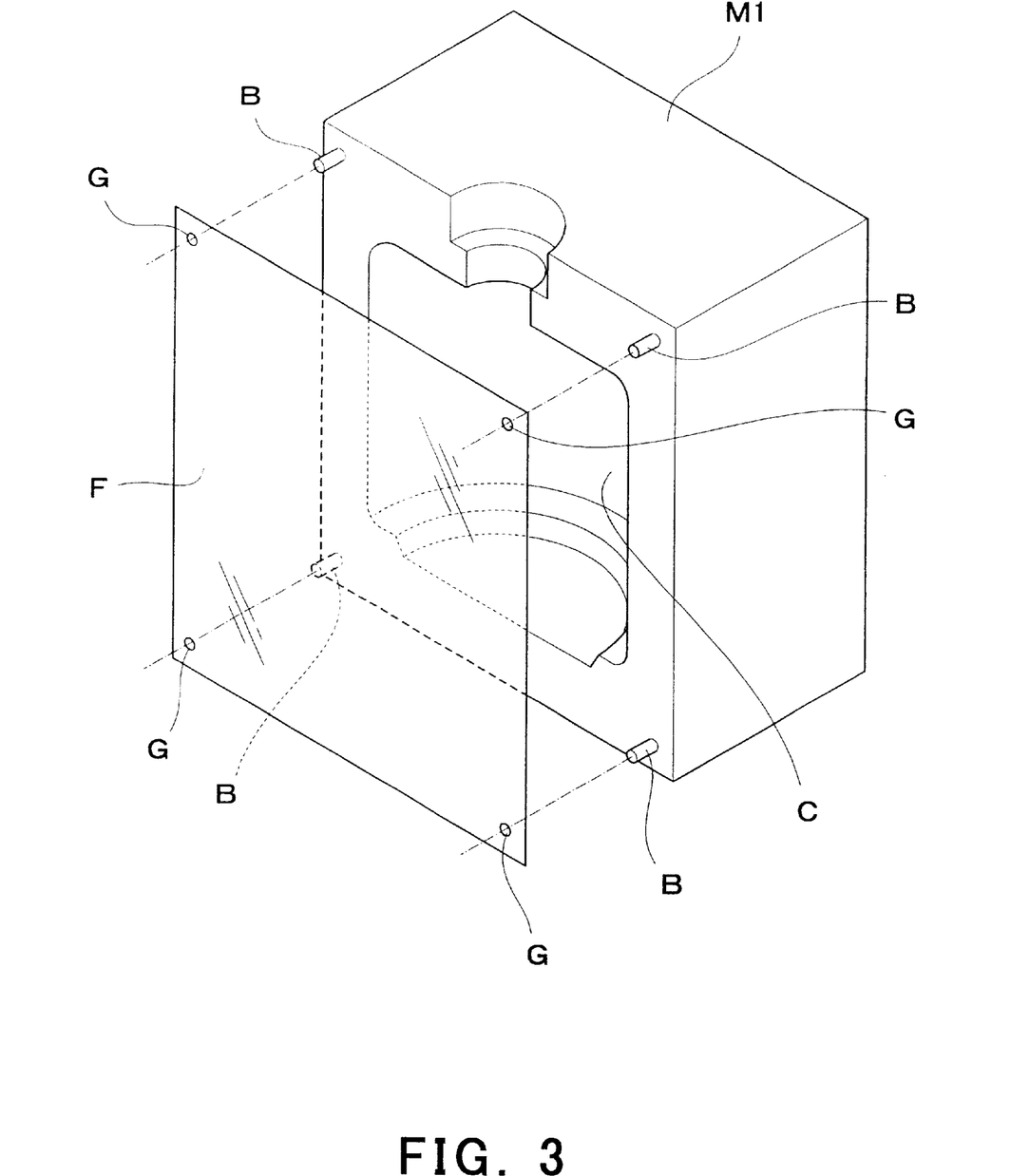
FIG. 3 is an explanatory view for explaining a method of placing a thermoplastic film on a mold used in the blow molding of the reserve tank according the present invention.

In addition, as shown in FIG. 3, the thermoplastic film F can be aligned over the cavity by forming holes G at a position where the thermoplastic film F is not in contact with the cavity and by inserting bosses B formed at a position on the mold half (in this example, "M1") corresponding to the holes G. Thus, it becomes possible to position the thermoplastic film F over the cavity of the mold half M1 easily.

Moreover, in accordance with the reserve tank for coolant formed by the above-mentioned blow molding method, as mentioned above, the reserve tank has a wide variety of applications because it is more resistant to scratches from the outside than common molded products which are colored with typical painting processes, it does not require any painting or surface treatment, it can be covered only one side with the thermoplastic film, and it is possible to freely expose the casting material (i.e., material of the parison) under the thermoplastic film by removing.

The above and further objects and features of the invention will more fully be apparent from the following detailed description with accompanying drawings.

DETAILED DESCRIPTION OF THE INVENTION

Hereafter, an example of a reserve tank mounted on a straddle-type-four-wheeled all terrain vehicle is explained in detail referring to the accompanying drawing as an embodiment of the reserve tank for engine coolant formed using the blow molding method according to the present invention.

Figure 4:
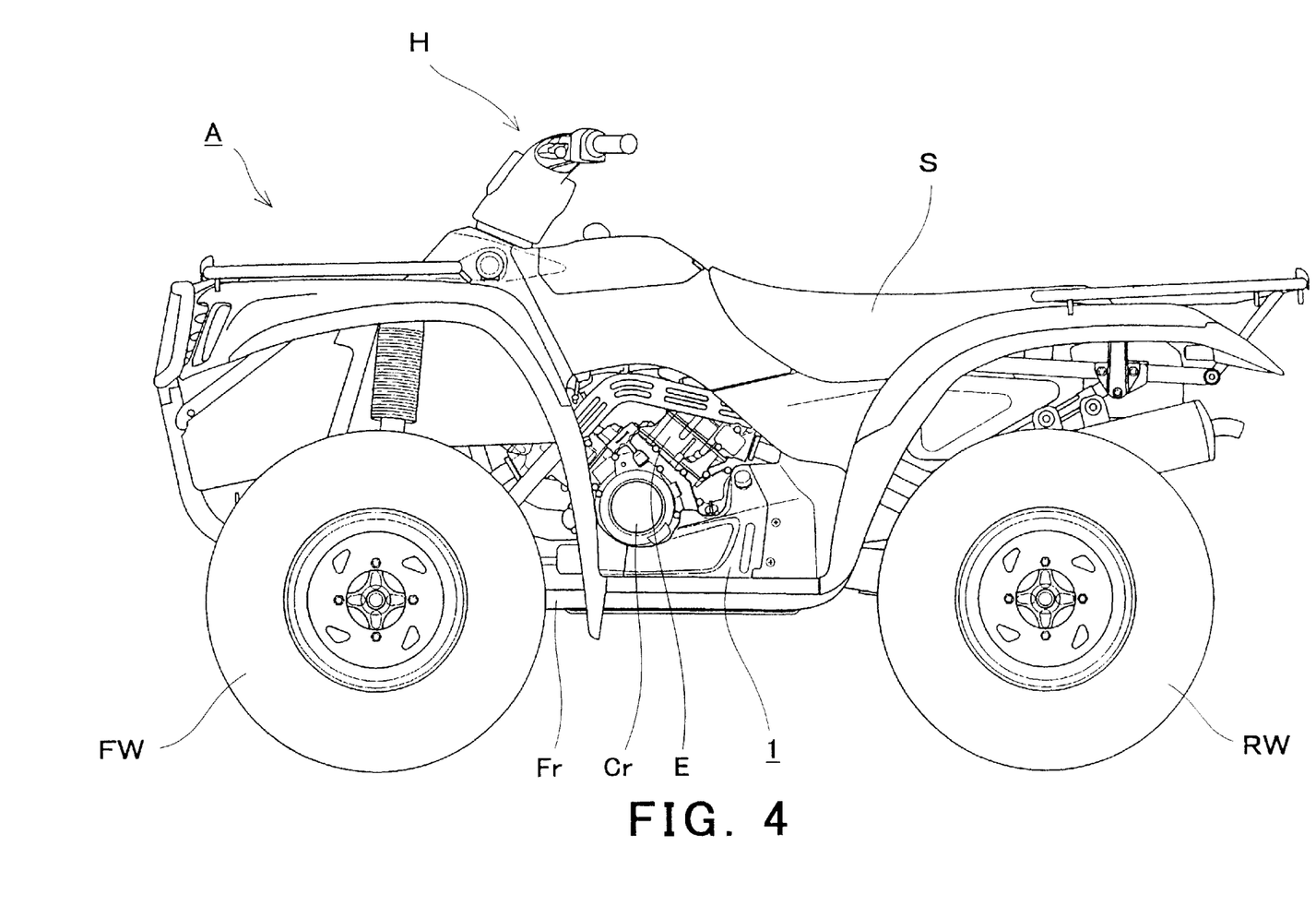
FIG. 4 is a left side view showing the entire configuration of a straddle-type all terrain vehicle according to an embodiment of the present invention.
Figure 5:
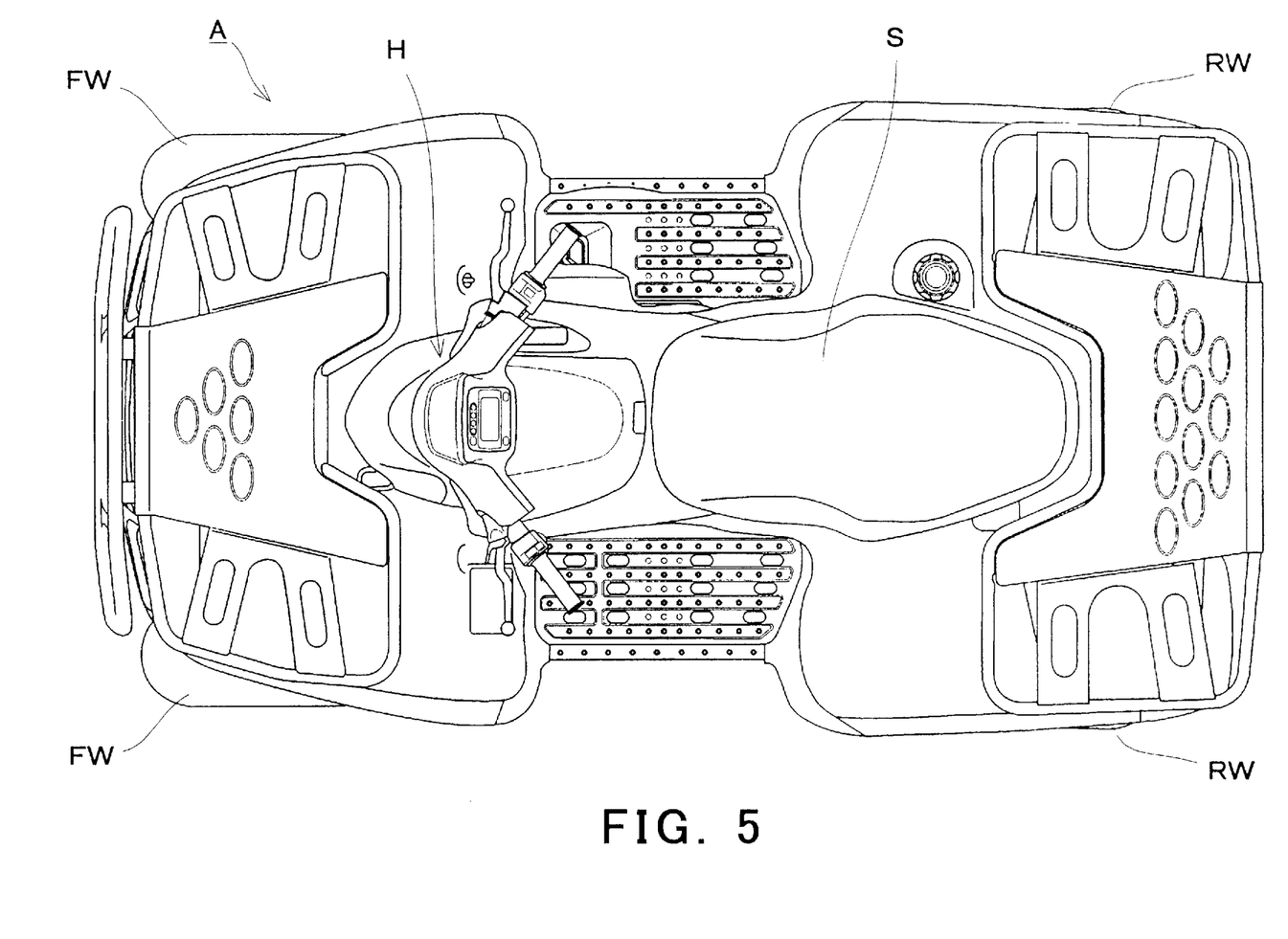
FIG. 5 is a plan view showing the entire configuration of the all terrain vehicle of FIG. 4.

FIG. 4 is a left side view showing the entire configuration of the all terrain vehicle according to the embodiment of the invention, and FIG. 5 is a plan view showing the entire all terrain vehicle of FIG. 4.

As shown in FIG. 4 and FIG. 5, in the all terrain vehicle A according to the embodiment, an engine E is mounted on the central part of the vehicle's body frames Fr which mostly consist of pipe material. A steering column (not shown) extending in approximately vertical direction with a predetermined caster angle is rotatably supported by the front part of the frames Fr. A bar handle H is being fixed to the upper end of this steering column, and the lower part of the steering column is connected to a pair of front wheels FW for steering the vehicle A, which are suspended by the front-lower part of the frames Fr on the right-and-left sides through a pair of tie rods (not shown), respectively.

A rider can grasp the handle H riding astride over a straddle-type seat S provided behind the handle H and attached to the rear-top part of the frames Fr, and rotate the handle H to right and left with the steering column to steer the front wheels FW toward right and left.

Moreover, a pair of rear wheels RW each having an independent axle are suspended by the rear part of the frames Fr on the right-and-left sides, respectively and these rear wheels RW are driven through transmission gears by the engine E.

Moreover, as for the engine E of the all terrain vehicle according to the embodiment, a water-cooled type is adopted, and as shown in FIG. 4, the vehicle A is equipped with a reserve tank 1 connected to a radiator (not shown) on one side of the engine E, extending from a part below a crank case Cr to the rear part thereof, exposed to the outside of the vehicle's body.

Figure 6:
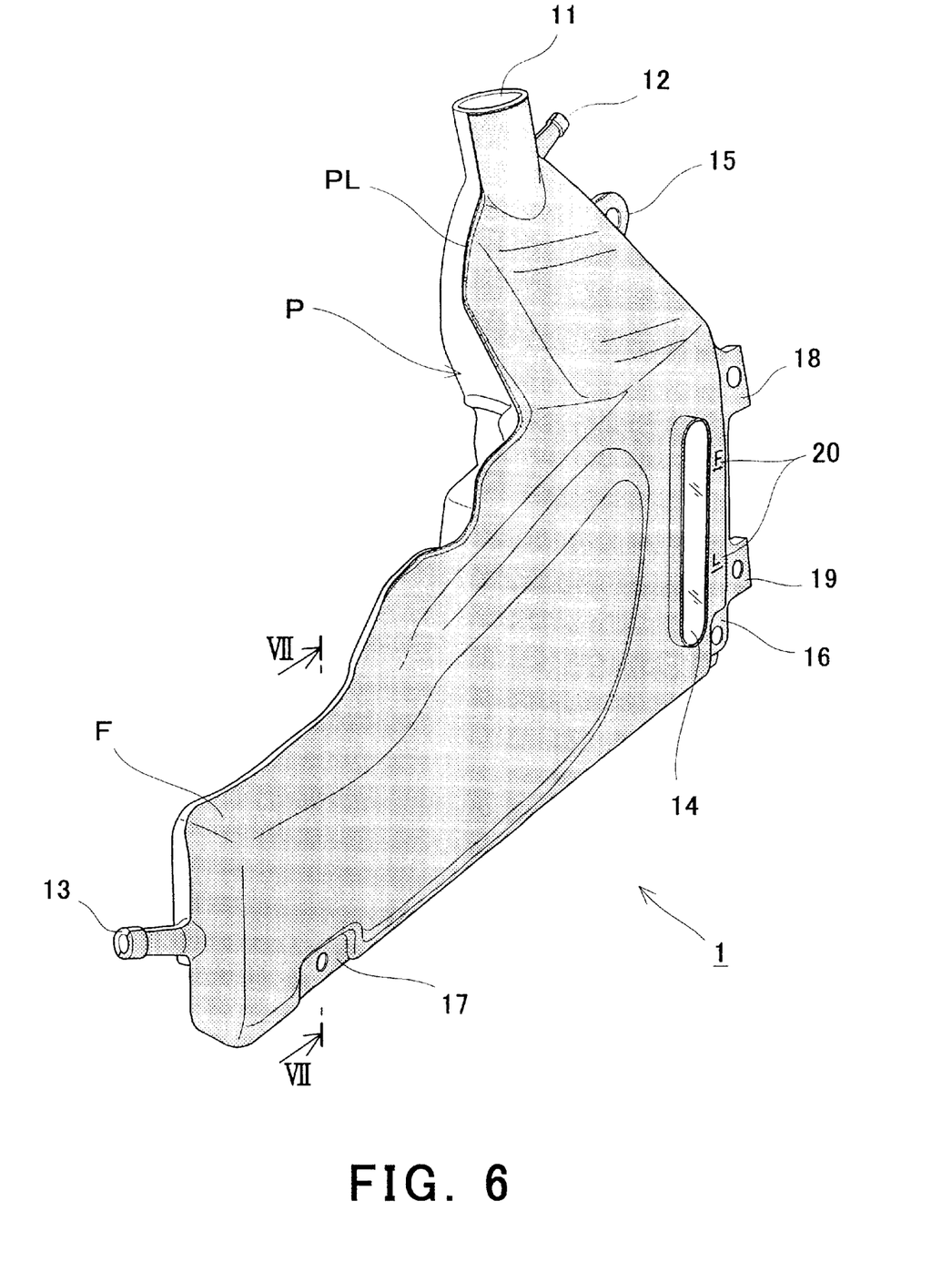
FIG. 6 is a perspective view showing the reserve tank formed by the blow molding method according to the present invention.
Figure 7:
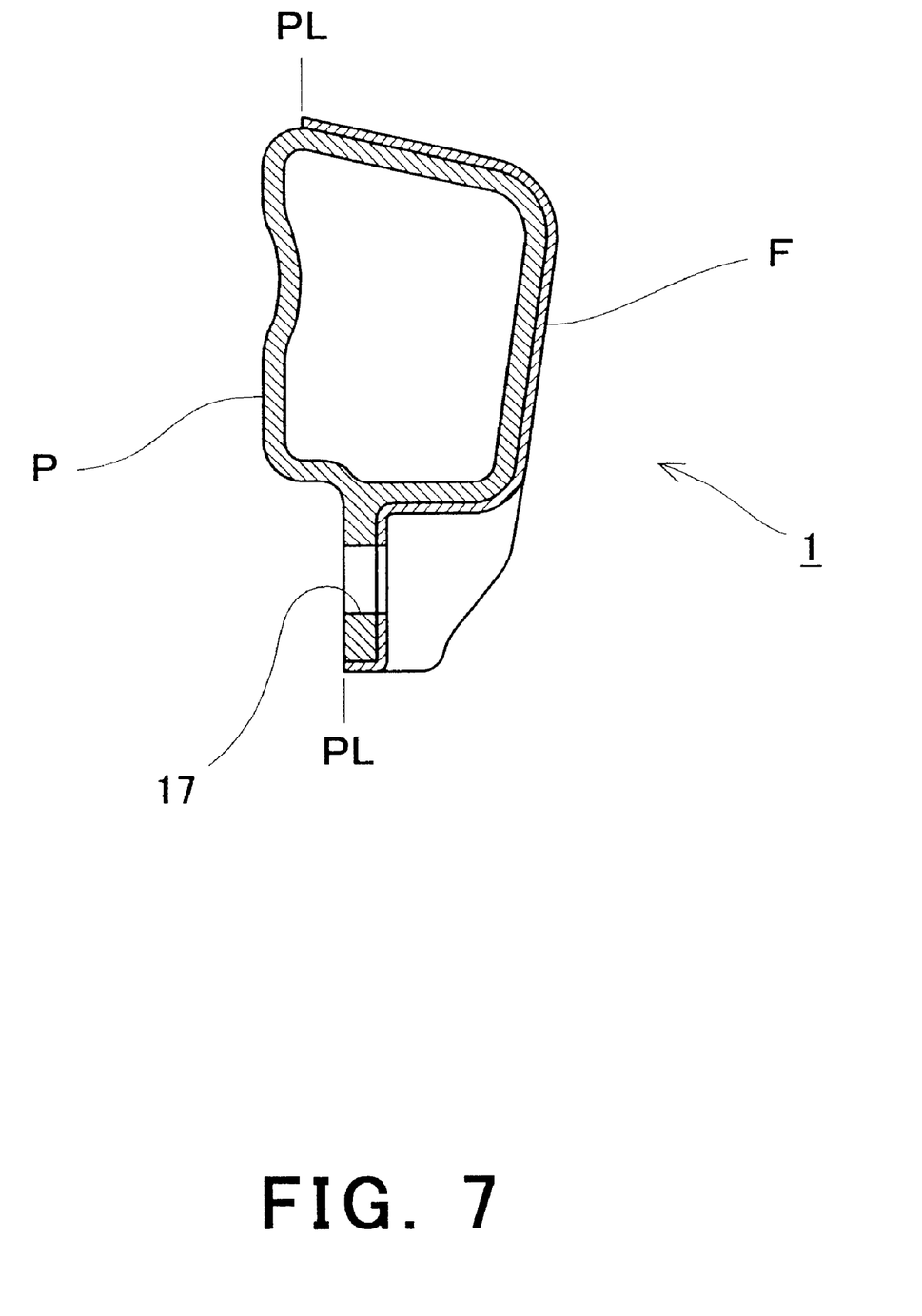
FIG. 7 is a cross-sectional view taken along a line VII—VII of FIG. 6.

Referring to the detailed perspective view shown in FIG. 6 and to the sectional view of FIG. 6 shown in FIG. 7, the above-mentioned reserve tank 1 is mainly fabricated from the material of a translucent white polypropylene series using the blow molding method mentioned above. Bordering on a partition line PL produced between the mold halves, the reserve tank 1 is so arranged that the side fabricated by one cavity faces to the outside of the vehicle's body and the side fabricated by other cavity faces to the inside of the vehicle's body. For this reason, typically only the side of the reserve tank 1 which faces to the outside of the vehicle's body is covered with the thermoplastic film F which is made of polypropylene series material with a color which united with the painted color of the vehicle's body in this embodiment (shown as a gray area in FIG. 6).

The reserve tank 1 is a L character-like hollow object as a whole as seen from the side of the vehicle, and is making the form where the upper part was bent to the inner side of vehicle.

An inlet 11 of coolant is formed in one piece with the reserve tank 1 at the topmost part of the reserve tank 1 along with the partition line PL. An air intake 12 is also formed in one piece with the reserve tank 1 in the proximity of the inlet 11 and the outlet 13 of the coolant to the above-mentioned radiator is formed in one piece with the reserve tank 1 at a lower position thereof.

In more detail, the inlet 11 is formed in the shape of a pipe extended upward to adjacent a top end of the reserve tank 1, and the air intake 12 is formed in the shape of a nipple projected to the rear of the vehicle from the base end of the pipe-shaped inlet 11. The outlet 13 is formed in the shape of a nipple projected to the front from the front end face of the reserve tank 1.

Moreover, a plurality of flanges 15, 16, and 17 are formed in one piece with the reserve tank 1 at below the air intake 12, at the outside corner of the L-shaped reserve tank 1, and at front part of the tank 1, respectively, along the partition line PL. A hole of screw for fixing the reserve tank 1 to the frames Fr is formed in each of the flanges 15, 16, and 17 after the blow molding process. Moreover, the similar flanges 18 and 19 are formed in one piece with the reserve tank 1 and a hole for mounting an exterior cover of the all terrain vehicle A allotted behind the reserve tank 1 is formed in each of these flanges 18 and 19.

Moreover, a part of the side wall of the reserve tank 1 covered with the thermoplastic film F (outside of the vehicle's body) is formed thicker than the other part. The state of coolant in the reserve tank 1 can be checked from the outside by removing the thermoplastic film F of this portion to form a check window 14. In this embodiment, the check window 14 has a predetermined length in the vertical direction, and a scale 20 which shows the quantity of coolant is formed in one part proximity to the check window 14.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A reserve tank for engine coolant formed by blow molding, wherein a method of said blow molding comprises the steps of:

forming a parison between halves of an open mold;

blowing air into the parison to expand while pinching the parison between the mold halves; and forming a hollow product by cooling to harden the expanded parison pressed in cavities of the mold halves;

wherein before pinching the parison between the mold halves, a thermoplastic film with a color which is different from the parison is so placed that the thermoplastic film covers at least one of the cavities; and and wherein when blowing the parison, the thermoplastic film placed over the cavity is pressed along with the parison and stuck thereto.

2. The reserve tank for engine coolant according to claim 1, wherein the thermoplastic film is made of a similar material to the parison.

3. The reserve tank for engine coolant according to claim 1, wherein the parison is made of a translucent or transparent material while the thermoplastic film is made of an opaque material, and wherein a check window for the engine coolant is formed by removing a portion of the thermoplastic film hardened and stuck to the parison so as to cover the parison.

4. A straddle-type all terrain vehicle having a reserve tank for engine coolant formed by blow molding, wherein a method of said blow molding comprises the steps of:

forming a parison between halves of an open mold;

blowing air into the parison to expand while pinching the parison between the mold halves; and forming a hollow product by cooling to harden the expanded parison pressed in cavities of the mold halves;

wherein before pinching the parison between the mold halves, a thermoplastic film with a color which is different from the parison is so placed that the thermoplastic film covers at least one of the cavities; and wherein when blowing the parison, the thermoplastic film placed over the cavity is pressed along with the parison and stuck thereto.

5. The straddle-type all terrain vehicle according to claim 4, wherein the reserve tank is arranged exposed outside of the vehicle's body so that the check window can be seen from the side of the vehicle.

\* \* \* \* \*